United States Patent [19]

Han et al.

[11] Patent Number: 5,278,213
[45] Date of Patent: Jan. 11, 1994

[54] METHOD OF PROCESSING NEUTRAL POLYANILINES IN SOLVENT AND SOLVENT MIXTURES

[75] Inventors: Chien-Chung Han, Madison; Lawrence W. Shacklette, Maplewood; Ronald Elsenbaumer, Morristownship, Morris County, all of N.J.

[73] Assignee: Allied Signal Inc., Morristown, N.J.

[21] Appl. No.: 689,420

[22] Filed: Apr. 22, 1991

[51] Int. Cl.$^5$ .............................................. C08K 5/20
[52] U.S. Cl. ..................................... 524/233; 528/422
[58] Field of Search .......................... 524/233; 528/422

[56] References Cited

U.S. PATENT DOCUMENTS

| 3,963,498 | 6/1976 | Trevoy | 96/87 A |
|---|---|---|---|
| 4,025,463 | 5/1977 | Trevoy | 252/500 |
| 4,615,829 | 10/1986 | Tamura et al. | 252/500 |
| 4,798,685 | 1/1989 | Yaniger | 252/500 |
| 4,806,271 | 2/1989 | Yaniger et al. | 252/500 |
| 4,822,638 | 4/1989 | Yaniger | 427/79 |
| 4,851,487 | 7/1989 | Yaniger et al. | 525/540 |
| 4,855,361 | 8/1989 | Yaniger et al. | 525/436 |
| 4,983,322 | 1/1991 | Elsenbaumer | 250/500 |
| 5,006,278 | 4/1991 | Elsenbaumer | 427/385.5 |

FOREIGN PATENT DOCUMENTS

| 20035713 | 2/1981 | European Pat. Off. | |
| 20152632 | 12/1984 | European Pat. Off. | |
| 20259813 | 9/1987 | European Pat. Off. | |
| 399299 | 11/1990 | European Pat. Off. | |
| 62-12073 | 1/1987 | Japan | |
| 62-47109 | 2/1987 | Japan | |
| WO9010297 | 9/1990 | PCT Int'l Appl. | |
| WO8901694 | 2/1989 | World Int. Prop. O. | 528/422 |

OTHER PUBLICATIONS

A. G. Green et al., "CCXLII-Aniline-black and Allied Compound", Part I., Green and Woodhead: Aniline Black, pp. 2388-2402, 1907.
A. G. MacDiarmid et al., "The Polyaniline Processing, Molecular Weight, Oxidation State and Derivaties", Polymer Preprints, American Chemical Society, vol. 30, No. 1, pp. 144-147, (1989).
X. Tung et al., "Molecular Weight of Chemically Polymerized Polyaniline", Makromol. Chem. Commun. 9, pp. 829, 831, 833 (1988).
Karl F. et al., "Spectroscopic and Morhological Characterization of Polyaniline Tosylate Thin Films", pp. 317-318 1989.
I. Motomichi et al., "New Soluble Polyaniline Synthesis, Electrical Properties and Solution Electronic Spectrum Syntheic Metals," 30 (1989) pp. 199, 201, 203, 205, 207.
M. Toatsu, "Report No. 8: Electroconductive Polymers(Update I)" Japanese R&D Trend Analysis, Advanced Materials-Phase II pp. 47-51 (Dec. 1990).
T. Masatake et al; "Secondary batteries with polyaniline cathods"; Aug. 8, 1988; Chemical Abstracts, vol. 109, No. 6, & Jpn. Kokai Tokkyo Koho JP 63 55,861(88 55,861) Mar. 10, 1988.
Chan et al., Thermal Analysis of Conducting Polymers Part I Analysis, 35, 765-774 (1989).
S. Li et al. "Soluble Polyaniline" Synthetic Metals, 20 (1987) pp. 141, 144, 145, 148, 149.
K. Hyodo et al. "Short Communication . . . High Ion Selective Electr chemical . . . " Electro Acia vol. 33, No. 1, pp. 165-166, 1983.
L. T. Yu et al. "Conductivite et Constitution Chimique pe Sen Conducteurs Macromoleculaires" Revue Generale de L'Elec. vol. 75 No. 9 pp. 1014-1018 (French) Sep. 1966.
M. Jozefowicz et al. "Relations entre Proprietes Chimiques et . . . " Revue Generale de L'Electricite vol. 75, No. 9, pp. 1008-1013; French, Sep. 1966.

(List continued on next page.)

Primary Examiner—Paul R. Michl
Assistant Examiner—John J. Guarriello
Attorney, Agent, or Firm—R. C. Stewart, II; G. H. Fuchs; D. L. Webster

[57] ABSTRACT

This invention relates to a solution or plasticized composition comprising one or more polyanilines, and one or more solvents capable of dissolving said polyanilines.

35 Claims, 2 Drawing Sheets

Hansen Solubility Parameters of Solvents for Polyaniline Base

OTHER PUBLICATIONS

M. Jozefowicz et al. "Proprietes Nouvelles des Polymeres Semi . . . " J. Poly. Sci. Part C/No. 22, pp. 1187–1195 (1968) (French).

T. Kobayashi et al. "Electrochemical Reactions Concerned with Electrochromism . . . " J. Electroanal Chem. 177/(1984) pp. 281–291.

T. Kobayashi et al. "Oxidative Degradation Pathway of Polyaniline Film Electrodes" J. Electroanal Chem. 177(1984) pp. 293–297.

F. Cristofini et al. "Proprietes Electrochimiques des Sulfates de Polyaniline" C.R. Acad. Sc. Paris, t. 268 (14 avril 1969) pp. 1346–1349.

D. Labarre et al. "Polymeres Conducteurs Organiques Filmogenes a base de Polyaniline" C.R. Acad. Sc. Paris, t. 269 (29 Oct. 1969) pp. 964–969 Series C.

R. de Surville et al. "Produits Oligomeres et Polymeres D'Oxydation des Amines Aromatiques" Ann. Chim. t2, 1967, pp. 5–13.

R. de Surville, "Electrochemical Chains Using Protolytic Organic Semiconductors" Elec. Acta 1958, vol. 13, pp. 1451–1458.

R. de Surville, "Produits D'Oxidation Poisée des Amines Aromatiques" Ann. Chim., t2, 1967, pp. 149–157.

FIG. 2

Hansen Solubility Parameters of Solvents and Non-solvents for Polyaniline Base

METHOD OF PROCESSING NEUTRAL POLYANILINES IN SOLVENT AND SOLVENT MIXTURES

BACKGROUND OF THE INVENTION
1. Field of the Invention

This invention relates to solutions of neutral substituted or unsubstituted polyanilines and to methods of forming such solutions. Another aspect of this invention relates to a method of using such solutions to form polymer articles, such as films, printings, coatings and parts.

2. Prior Art

There has recently been an increased interest in the electrochemistry and electrical phenomena of polymeric systems. Recently, work has intensified with polymers having extended conjugation in at least one backbone chain.

One conjugated polymer system currently under study is polyaniline. Kobayashi, et al., *J. Electroanal, Chem.*, "Electrochemical Reactions Concerned With Electrochromism of Polyaniline Film-Coated Electrodes", 177, 281–291, (1984) describes various experiments in which spectro-electrochemical measurements of a polyaniline film coated electrode were made. French Patent No. 1,519,729; French Patent of Addition 94,536; U.K. Patent 1,216,549; "Direct Current Conductivity of Polyaniline Sulfate", M. Doriomedoff, F. Kautiere-Cristofini, R. De Surville, M. Jozefowicz, L-T. Yu, and R. Buvet, *J. Chim. Phys. Physicohim. Brol.* 68, 1055 (1971); "Continuous Current Conductivity of Macromolecular Materials", L-T. Yu, M. Jozefowicz, and R. Buvet, *Chim. Macromol.*, 1, 469 61970); "Polyaniline Based Filmogenic Organic Conductive Polymers", D. LaBarre and M. Jozefowicz, *C. R. Acad. Sci., Ser. C.* 269, 64 (1969); "Recently Discovered Properties of Semiconducting Polymers", M. Jozefowicz, L-T. Yu, J. Perichon, and R. Buvet, *J. Polym, Sci.* Part C, 22 1187–1195 (1969); "Electrochemical Properties of Polyaniline Sulfates:, F. Cristofini, R. DeSurville, and M. Jozefowicz, *C. R. Acad. Sci., Ser. C.* 268, 1346 (1979); "Electrochemical Cells Using Protolytic Organic Semiconductors", R. De Surville, M. Jozefowicz, L-T. Yu, J. Perichon, R. Buvet, *Electrochem. Ditn.*, 13, 1451 (1986); "Oligomers and Polymers Produced by Oxidation of Aromatic Amines", R. De Surville, M. Jozefowicz, and R. Buvet, *Ann. Chem.* (Paris), 2, 5 (1967); "Experimental Study of the Direct Current Conductivity of Macromolecular Compounds", L-T. Yu, M. Borredon, N. Jozefowicz, G. Belorgey, and R. Buvet, *J. Polym. Sci, Part C.*, 16, 2931 (1967); "Conductivity and Chemical Properties of Oligomeric Polyaniline", M. Jozefowicz, L-T. Yu, G. Belorgey and R. Buvet, *J. Polym. Sci., Part C.*, 16, 2943 (1967); "Products of the Catalytic Oxidation of Aromatic Amines", R. De Surville, M. Jozefowicz, and R. Buvet, *Ann. Chem.* (Paris), 2, 149 (1967); "Conductivity and Chemical Composition of Macromolecular Semiconductors", *Rev. Gen. Electr.*, 75, 1014 (1966); "Relation Between the Chemical and Electrochemical Properties of Macromolecular Semiconductors", M. Jozefowicz and L-T. Yu, Rev. Gen. Electr., 75, 1008 (1966); "Preparation, Chemical Properties, and Electrical Conductivity of Poly-N-Alkyl Anilines in the Solid State", D. Muller and M. Jozefowicz, *Bull. Soc. Chem.*, Fr. 4087 (1972).

U.S. Pat. Nos. 3,963,498 and 4,025,463 describe oligomeric polyanilines and substituted polyanilines having not more than 8 aniline repeat units which are described as being soluble in certain organic solvents and which are described as being useful in the formation of semiconductor compositions having bulk electrical conductivities up to about $7 \times 10^{-3}$ S/cm and, surface resistivities of $4 \times 10^7$ ohm/square. European Patent No. 0017717 is an apparent improvement in the compositions of U.S. Pat. Nos. 3,963,498 and 4,025,463 and states that the polyaniline can be formed into a latex composite through use of acetone solutions of the oligomers of polyaniline and suitable binder polymers.

U.S. Pat. No. 4,855,361 describes a conductive polymer blend which comprises mixing a polyamide with a base-type polymer containing carbon nitrogen linkages, such as polyaniline, having a polyamide-like group covalently linked to the nitrogen atoms of the base-type polymer. The conductive polymer blend is formed by first reacting a base-type non-conductive polymer containing carbon-nitrogen linkages, such as polyaniline, with a carbonyl anhydride, such as 3,4, 3',4'-benzophenone tetracarboxylic dianhydride to form a conductive polymer containing polyimide-like groups covalently linked to the nitrogen atoms of the base-type polymer, mixing such conductive polymer with non-conductive polyamide in a suitable solvent, removing the solvent, and forming a conductive continuous phase blend of the polyamide and the conductive polymer.

U.S. Pat. No. 4,798,685 describes the production of base-type conductive polymers, particularly from the family of conductive polyaniline, by reacting a base-group non-conductive polymer containing carbon-nitrogen linkages, e.g. polyaniline, with an R+ donor compound, where R is an organic group, e.g. methyl iodide, and forming an electrically conductive polymer in which the R groups are covalently linked to the nitrogen atoms of the polymer.

U.S. Pat. No. 4,806,271 describes the production of base-type conductive polymers, particularly from the family of conductive polyaniline, by reacting a base-type non-conductive polymer containing carbon-nitrogen linkages e.g., polyaniline, with a cation donor compound, such as $R_2SO_4$, $R'SO_2Cl$ or $R''_3SiCl$, where R, R' and R" are alkyl or aryl, such as dimethyl sulfate or tosyl chloride, and forming an electrically conductive polymer in which the R groups of $R_2SO_4$, the $R'SO_2$ groups of $R'SO_2Cl$, or the $R''_3Si$ groups of $R''_3SiCl$ are covalently linked to the nitrogen atoms of the polymer.

U.S. Pat. No. 4,822,638 describes a process for fabricating an electronic device on a non-conductive polymer substrate, particularly from the family of polyaniline, which comprises applying a covalent doping agent, such as an R+ donor compound, where R is an organic group, e.g., methyl iodide, to a preselected portion of a base-type non-conductive polymer substrate containing carbon-nitrogen linkages, and converting such preselected portion of the polymer substrate to an electrically conductive polymer portion, by covalent linkage of the R groups of such donor compound, to the nitrogen atoms of the non-conductive polymer substrate. Electronic devices, such as resistors, capacitors, inductors, printed circuits and the like, can be provided by the invention process, in the form of light-weight polymers containing no metal, and which are stable and wherein the conductive portions are non-diffusing.

U.S. Pat. No. 4,851,487 describes the Production of base-type conductive polymers, particularly from the family of conductive polyaniline, by reacting a base-type non-conductive polymer containing carbon-nitrogen linkages, e.g., polyaniline, with an anhydride such as $R-SO_2-O-SO_2-R'$, $R-CO-O-CO-R'$ or $R-CO-O-SO_2R$ or mixtures thereof where R and R' are alkyl or aryl, e.g., tosylic anhydride or benzophenone tetracarboxylic dianhydride, and forming an electrically conductive polymer in which the $SO_2R$ and COR groups are covalently linked to the nitrogen atoms of the conductive polymer and the anion of the conductive polymers is the $RSO_3^-$ or $R'CO_2^-$ group.

U.S. Pat. No. 4,798,685 describes the production of base-type conductive polymers, particularly from the family of conductive polyaniline, by reacting a base-type non-conductive polymer containing carbon-nitrogen linkages, e.g., polyaniline, with an $R^+$ donor compound, where R is an organic group, e.g., methyl iodide, and forming an electrically conductive polymer in which the R groups are covalently linked to the nitrogen atoms of the polymer.

PCT W089/01694 describes various electrically conductive polyanilines doped with certain sulfonated dopants. These materials are disclosed as thermally stable and capable of being melt blended to form blends with other types of polymers.

Several solvents for neutral (undoped) polyaniline are known. For example, F. Wudl et al., *J. Am. Chem. Soc.*, 109, 3677(198) disclosed dimethylformamide as a solvent for polyaniline base. U.S. Pat. No. 4,913,867 discloses N-methyl pyrrolidone as a solvent for polyaniline, and A. MacDiarmid, et al. *Polym. Preprints*, 30, 147 (1989) disclosed N-methylpyrrolidone as a solvent for the neutral reduced (leuco) form of polyaniline. Similarly, X. Tang et al. *Makroml. Chem. Rapid Commun.*, 9, 829–834 disclose N-methylpyrrolidone and dimethylformamide as solvents for high molecular weight polyaniline and tetrahydrofuran as a solvent for low molecular weight polyaniline. A. G. Green and A. E. Woodhead, J. Chem. Soc., 2388(1940) discloses pyridine as a solvent for neutral polyaniline, but indicates that such solutions are unstable. M. Angelopoulos, et al. *Mol. Cryst. Liq. Cryst. Bulletin.* p 240 (1988) discloses dimethyl sulfoxide, dimethylformide, and N-methylpyrrolidone as solvents neutral polyaniline and M. Inoue et al. *Synth. Met.*, 30, 199(1989) discloses dimethylsulfoxide, ethanol and chloroforam as solvents for specially prepared "soluble" polyaniline base described as unbranched and uncrosslinked.

SUMMARY OF THE INVENTION

One aspect of this invention relates to a solution and to a plasticized composition comprising one or more substituted or unsubstituted polyanilines; and one or more solvents capable of dissolving said polyaniline to some extent, capable of plasticizing said polyaniline or a combination thereof. As used herein "solution" is a real solution or an ultra-fine dispersion having an average particle size of less than about 100 nanometers, and, as used herein, a "plasticized composition" is a polymer or a polymer blend which is softened by incorporation of a liquid or low melting temperature solid generally to a level of more than about 1% by weight and less than about 20%. As used herein "polyaniline" is a polymer which is synthesized for example by the head-to-tail linkage of substituted or unsubstituted anilines, and, which depending on oxidation state, consists of phenyl rings and amine linkages (—NH— or —NR— where R is a substituent other than hydrogen) with varying amounts of quinoid rings and imine (—N=) linkages. As used herein "neutral or undoped polyaniline" is characterized by an uncharged backbone and "polyaniline base" is a particular form of undoped polyaniline which contains at least one quinoid diimine linkage in the backbone.

Another aspect of this invention relates to a method of forming a neutral article or forming a neutral polymer coated substrate from the solution or plasticized composition of this invention which comprises the steps of:

(a) forming a non-electrically conductive solution or plasticized composition comprising one or more substituted or unsubstituted polyanilines; and one or more solvents capable of dissolving said polyanilines to some extent or capable of plasticizing said polyaniline or a combination thereof;

(b) placing all or a portion of said non-electrically conductive solution or plasticized composition onto a substrate or into the shape of an article; and (c) removing all or a portion of said solvent from said solution or Plasticized composition to form a solidified, neutral polyaniline having the configuration of said article or a substrate coated with said polyaniline.

Still another aspect of this invention relates to a method of forming an electrically conductive article or forming a conductive polymer coated substrate from the solution or plasticized composition of this invention which comprises the steps of:

(a) forming a non-electrically conductive solution or plasticized composition comprising one or more substituted or unsubstituted polyanilines, and one or more solvents capable of dissolving said polyanilines to some extent or capable of plasticizing said polyaniline or a combination thereof;

(b) placing all or a portion of said non-electrically conductive solution or plasticized composition onto a substrate or into the shape of an article;

(c) removing all or a portion of said solvent from said solution or plasticized composition to form a solidified, neutral polyaniline having the configuration of said article or a substrate coated with said polyaniline; and (d) doping said neutral polyaniline.

Yet another aspect of this invention relates to an article of manufacture formed through use of the solution and process of this invention. Through use of this invention polyaniline can be conveniently processed into useful conductive articles of all shapes such as fibers, coatings, printings, films and the like using conventional solution or plasticized polymer techniques.

BRIEF DESCRIPTION OF THE DRAWINGS

The invention will be more fully understood and further advantages will become apparent when reference is made to the following detailed description of the invention and accompanying drawings in which.

DETAILED DESCRIPTION OF THE INVENTION

The solutions or plasticized compositions of this invention comprise two essential ingredients. One essential ingredient is a substituted or unsubstituted polyaniline. Any form of substituted and unsubstituted polyaniline can be conveniently used in the practice of this invention. Illustrative of useful forms are those described in Green, A. G. and Woodhead, A. E., CXVII Aniline-black and Allied Compounds, Part II, *J. Chem. Soc.*. 101, pp1117 (1912) and Kobayashi, et al., "Electrochemical Reactions . . . of Polyaniline Film-Coated Electrodes", *J. Electroanal, Chem.*, 177, pp. 281-91 (1984) and in Shacklette, L. W. et al. "Structure and Properties of Polyaniline as Modeled by Single-Crystal Oligomers", *J. Chem Phys.*, 88, 3955 (1988), which are hereby incorporated by reference. For example, unsubstituted or substituted polyaniline, useful forms of which are characterized by different ratios of phenylene amine and quinone imine backbone segments, include leucoemeraldine, protoemeraldine, emeraldine, nigraniline and pernigraniline.

In the preferred embodiments of this invention, polyanilines for use in the invention are homopolymers and copolymers of the type derived from the polymerization of unsubstituted and substituted anilines of the Formula I:

wherein:
n is an integer from 0 to 5;
m is an integer from 0 to 5, with the proviso that the sum of n and m is equal to 5; and
$R_1$ is the same or different at each occurrence and is selected from the group consisting of boric acid, phosphinic acid, phosphoric acid, sulfinate salt, amido, carboxylic acid, hydroxyamino, phosphonic acid, halo, hydroxy, cyano, sulfinic acid, carboxylate salt, borate salt, phosphate salt, sulfonate, phosphinate salt, phosphonate salt, amino, sulfonic acid, nitro, amino, cyano, sulfate salt, deuterium or substituted or unsubstituted arylsulfinyl, alkoxycarbonyl, arylsulfonyl, alkylamido, dialkylamido, arylamido, diarylamido, alkylarylamido, alkyl, alkenyl, alkoxy, cycloalkyl, cycloalkenyl, alkanoyl, alkylthio, aryloxy, alkylthioalkyl, alkylaryl, arylalkyl, alkylamino, dialkylamino, alkylarylamino, arylamino, diarylamino, aryl, alkynyl, alkylsulfinyl, aryloxyalkyl, alkylsulfinylalkyl, alkoxyalkyl, alkoxyaryl, alkylsulfonyl, arylthio, alkylsulfonylalkyl, or alkylsilane or any two $R_2$ groups together or any $R_1$ group together with any $R_2$ group may form a substituted or unsubstituted alkylene, alkynylene, or alkenylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, ester, carbonyl, sulfonyl or oxygen atoms, wherein permissible substituents are one or more amino, alkylamino, dialkylamino, amido, alkylamido, dialkylamido, arylamido, diarylamido, alkylarylamido, arylamino, sulfinic acid, diarylamino, alkylarylamino, phosphonic acid, sulfonic acid, phosphoric acid, boric acid, carboxylate salt, borate salt, sulfonate salt, phosphinate salt, phosphonate salt, hydroxylamino, quaternary ammonium salt, phosphate salt, sulfinate salt, phosphinic acid, sulfate salt, carboxylic acid, halo, nitro, cyano or epoxy moieties; $R_1$ or $R_2$ is an aliphatic moiety having repeat units of the formula:

wherein
q is a positive whole number; and
$R_2$ is the same or different at each occurrence and is $R_1$ substituents or hydrogen. Illustrative of the polyanilines useful in the practice of this invention are those of the Formulas II to V:

or or or wherein:
$R_1$ and $R_2$ are as describe above;
n and m are the same or different at each occurrence and are integers from 0 to 4, with the proviso that the sum of n and m is 4; and
y and x are the same or different at each occurrence and are integers equal to or greater than 0, with the proviso that the sum of x and y is greater than 0, preferably x is an integer equal to or greater than about 1 and/or the ratio of x to y is greater than or equal to about 0.5; and
z is an integer equal to or greater than 1.

The following listing of substituted and unsubstituted anilines are illustrative of those which can be used to prepare polymers and copolymers useful in the practice of this invention.
2-Cyclohexylaniline
2-Acetylaniline
Aniline
2,5-Dimethylaniline
o-Toluidine
2,3-Dimethylaniline
4-Propanoylaniline
N-Pentylaniline
2-(Methylamino)aniline
4-Benzylaniline
2-(Dimethylamino)aniline 4-Aminoaniline
2-Methyl-4-methoxycarbonylaniline
2-Methylthiomethylaniline
4-(2,4-Dimethylphenyl)aniline
N-Ethylaniline
4-Carboxyaniline
2-Ethylthioaniline
N-Methyl aniline N-Methyl
2,4-Dimethylaniline
N-Propyl aniline
N-Propyl m-Toluidine
N-Hexyl aniline
N-Methyl-o-Cyanoaniline
m-Toluidine
2,5-Dibutylaniline
o-Ethylaniline
2,5-Dimethoxyaniline
m-Ethylaniline
Tetrahydronaphthylamine
o-Ethoxyaniline
mo-Cyanoaniline
m-Butylaniline
2-Methylthioaniline
m-Hexylaniline
2,5-Dichloroaniline
m-Octylaniline
3-(n-Butanesulfonic acid)aniline
4-Bromoaniline
2-Bromoaniline
3-Propoxymethylaniline
3-Bromoaniline
2,4-Dimethoxyaniline
3-Acetamidoaniline
4-Mercaptoaniline
4-Acetamidoaniline
4-Ethylthioaniline
5-Chloro-2-methoxy-aniline
3-phenoxyaniline
5-Chloro-2-ethoxy-aniline
4-phenoxyaniline
N-Hexyl-m-Toluidine
N-Octyl m-Toluidine
4-Phenylthioaniline
4-Trimethylsilylaniline
3-Amino-9-methylcarbazole
3-Amino carbazole
2-Amino carbazole
4-Amino carbazole
N-(p-Amino phenyl)aniline
3-Butoxyaniline
2-Butoxyaniline
2,5-Dibutoxyaniline

Exemplary of useful $R_2$ groups are hydrogen, methyl, ethyl, isopropyl, butyl, isobutyl, hexyl, octyl, benzyl, and the like.

Illustrative of useful $R_1$ groups are hydrogen, alkyl such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; alkylsulfinyl, alkylsulfonyl, alkylthio, arylsulfonyl, arylsulfonyl, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxyethyl, ethoxycarbonyl, butoxycarbonyl and the like; cycloalkyl such as cyclohexyl, cyclopentyl, cyclooctyl, cycloheptyl and the like; alkoxyalkyl such as methoxymethyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid groups such as sulfonic acid, carboxylic acid and the like; organic radicals substituted with acid groups and salts thereof such as alkoxy, alkoxyalkyl, alkylamino, arylamino, alkyl or aryl groups substituted with various acid groups such as phosphonic acid, phosphinic acid, sulfinate, sulfonic acid, sulfinic acid, phosphoric acid, boric acid, or carboxylic acid groups such as ethylsulfonic acid, propylsulfonic acid, butylsulfonic acid, phenylsulfonic acid, and the corresponding phosphoric acid, boric acid, sulfonic acid, carboxylic acid, sulfinate, sulfinic acid, phosphonic acid, and phosphinic acid; and amino, alkylamino, dialkylamino, arylamino, diarylamino, or alkylarylamino groups such as amino, methylamino, ethylmethylamino, ethylamino, dimethylamino, phenylamino, diphenylamino, methylphenylamino and the like.

Also illustrative of useful $R_1$ groups are divalent moieties derived from any two $R_1$ groups or a $R_1$ group with any $R_2$ group such as moieties of the formula:

wherein a is an integer from about 3 to about 7, and b is an integer from 1 to 2 and $R_3$ is the same or different at each occurrence and is hydrogen or alkyl, as for example such moieties which optionally include heteroatoms of oxygen, nitrogen, ester, sulfonyl, carbonyl, sulfinyl, and/or sulfur such as —CH$_2$SCH$_2$— —CH$_2$NHCH$_2$—, —SCH$_2$NHCH$_2$—, —O—CH$_2$—S—CH$_2$—, —CH$_2$S(O$_2$)CH$_2$—, —O(CH$_2$)$_2$O—, —CH$_2$S(O)CH$_2$—, —OC(O)CH$_2$CH$_2$—, —CH$_2$C(O)CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydrobenzothiazineamine, benzothiopyranamine, dihydrobenzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepineamine, benzimidazolylamine, benzoisoxazoleamine, benzoxazolylamine, benzotriazineamine, benzoxazineamine, naphthaleneamine, benzopyranamine, benzothiazineamine, anthraceneamine, aminobenzothiopyran, aminobenzodiazine, benzethiopyroneamine, aminocoumarin, benzothiopheneamine, benzothiodiazoleamine, and the like.

Preferred for use in the practice of this invention are polyanilines of the above Formulas II to V in which:

n is an integer from 0 to about 2;

m is an integer from 2 to 4, with the proviso that the sum of n and m is equal to 4;

$R_1$ is aryl, alkyl or alkoxy having from 1 to about 30 carbon atoms, cyano, halo, sulfonic acid, carboxylic acid, boric acid, borate, phosphoric acid, phosphate, phosphonic acid, phosphonate, phosphinic acid, phosphinate, sulfinic acid, sulfinate, carboxylate, sulfonate, amino, alkylamino, dialkylamino, arylamino, hydroxy, diarylamino, alkylarylamino, or alkyl, aryl or alkoxy substituted with phosphonic acid, phosphate, phosphoric acid, borate, sulfonate, amino, alkylamino, dialkylamino, arylamino, diarylamino, alkylarylamino, carboxylate, hydroxy, alkoxy, phosphonate, boric acid, alkyl, phosphinic acid, phosphonate, phosphinate, carboxylic acid or sulfonic acid substituents;

$R_2$ is the same or different at each occurrence and is a $R_1$ substituent or hydrogen;

x is an integer equal to or greater than 1;

y is equal to or greater than 0, with the proviso that the ratio of x to y is greater than about 1; and z is an integer equal to or greater than about 5.

Particularly preferred for use in the practice of this invention are polyanilines of the above Formulas in which:

n is an integer from 0 to 1;

m is an integer from 3 to 4, with the proviso that the sum of n and m is equal to 4;

$R_1$ is aryl, alkyl or alkoxy having from 1 to about 20 carbon atoms, sulfonic acid, halo, carboxylic acid, amino, carboxylate, alkylamino, phosphonate, dialkylamino, arylamino, phosphonic acid, boric acid, phosphate, phosphoric acid, borate, diarylamino, alkylyarylamino or alkyl or aryl substituted with carboxylic acid, phosphoric acid, boric acid, phosphate, phosphonic acid, borate, sulfonate, amino, alkylamino, dialkylamino, arylamino, diarylamino, alkylarylamino, carboxylate, halo, phosphonate, or sulfonic acid substituents;

$R_2$ is the same or different at each occurrence and is a $R_1$ subsituent or hydrogen;

x is an integer equal to or greater than 2;

y is equal to or greater than 0, with the proviso that the ratio of x to y is greater than about 2; and z is an integer equal to or greater than about 5.

Amongst the particularly preferred embodiments, most preferred for use in the practice of this invention are polyanilines of the above Formulas III or V in which:

n is an integer from 0 to 1;

m is an integer from 3 to 4, with the proviso that the sum of n and m is equal to 4;

$R_1$ is aryl, alkyl or alkoxy from 1 to about 15 carbon atoms, amino, alkylamino, dialkylamino, arylamino, diarylamino, alkylarylamino, halo, sulfonic acid, sulfonate, carboxylic acid, carboxylate, or alkyl or aryl substituted with one or more sulfonic acid, carboxylate, amino, alkylamino, dialkylamino, arylamino, diarylamino, halo, alkylarylamino, sulfate, sulfonic acid, or carboxylic acid substituents;

$R_2$ is hydrogen;

x is an integer equal to or greater than 2;

y is equal to or greater than 1, with the proviso that the ratio of x to y is equal to or greater than about 2; and z is an integer equal to or greater than about 5.

In the most preferred embodiments of this invention, the polyaniline is derived from unsubstituted aniline, alkoxy, alkyl, or sulfonic acid substituted aniline or copolymers thereof.

In general, the number of aniline repeat units is not critical and may vary widely. The greater the number of aniline repeat units the greater the viscosity and molecular weight of the polyaniline. In those applications where a polyaniline of lower molecular weight and viscosity is required, such material may be used, and in those applications where a polyaniline of high molecular weight and viscosity is required, then such material can be used. The number of aniline repeat units is preferably at least about 10. The upper limit can vary widely depending on the desired viscosity and molecular weight and the required degree of processibility i.e. melt processibility, solution processibility and the like. In the more preferred embodiments of the invention, the number of aniline repeat units is at least about 20, and in the particularly preferred embodiments, the number of repeat units is at least about 30. Amongst the particularly preferred embodiments, most preferred are those embodiments in which the number of repeat units is at least about 40.

Useful polyanilines can be prepared through use of chemical and electrochemical synthetic procedures. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of 10 S/cm. This conductive form of polyaniline can be treated with ammonium hydroxide in ethanol to form a non-conductive form of polyaniline which is dark blue in color and which has a conductivity equal to or greater than of about $10^{-10}$ S/cm. Other chemical procedures for preparation of various chemical forms of polyaniline are described in detail in Green et al. described above.

Useful forms of polyaniline can also be prepared electrochemically. For example, useful forms of polyaniline can be prepared by the electrochemical oxidation of aniline in aqueous fluoroboric acid electrolyte on a platinum foil anode.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The second component of the solution or plasticized composition of this invention is an "effective solvent" which is capable of dissolving or plasticizing neutral polyaniline, preferably in one of the forms described by Formulas I through V, to form the solution or plasticized composition of this invention. As used herein, "an effective solvent" is a solvent which has a relative dielectric constant of equal to or greater than about 5, and a dipole moment equal to or greater than about $3.5 \times 10^{-30}$ Cm other than dimethylformamide, N-methylpyrrolidone, pyridine, and dimethylsulfoxide. Preferred solvents are those solvents with dielectric constants equal to or greater than about 6 and dipole moments equal to or greater than about $5 \times 10^{-30}$ Cm.

Preferred solvents have a relatively strong hydrogen bonding capability. The degree of hydrogen bonding capability can be assessed by a variety of techniques. One method which we find to be most predictive of suitable solvents for the present invention is that Craver, *J. Appl. Polym Sci.* 14, 1755 (1970). This method is based upon the relative sound velocity ($\gamma_w$) in paper weeted by the solvent, where water is arbitrarily assigned a value of 100. By this measure, suitable solvents are those which have a hydrogen bonding capability greater than about 50, and more preferably greater than about 60.

Another useful measure of suitable solvents is the solubility parameter of the liquid, also referred to as the Hildebrand Parameter ($\delta$). Preferred solvents have a Hildebrand Parameter which lies in the range of from about 17 to about 29, more preferably in the range of from about 18 to about 26, and most preferably in the range of from about 19 to about 25.

An even more useful measure of suitable solvents is based on dividing the Hildebrand Parameter of the liquid into separate contributions from dispersion ($\delta_d$), from polar interactions ($\delta_p$), and from hydrogen bonding interactions ($\delta_h$). In this scheme (which is disclosed in "Handbook of Solubility Parameters and Other Cohesion Parameters", by Allan F. M. Barton (CRC Press, 1983) pp 141-162, 94-110) the Hildebrand Parameter is related to the contribution from dispersion ($\delta_d$), polar interactions ($\delta_p$) and hydrogen bonding interaction ($\delta_h$) ("Hansen Parameters") by the relation $$\delta^2 = \delta_d^2 + \delta_p^2 + \delta_2^2$$

For example, in order to judge the suitability of a solvent for polyaniline, we have empirically determined solubility parameters for the neutral base form of polyaniline which contains approximately a 50/50 ratio of amine to imine nitrogen linkages as follows:

$\delta_d = 17.4$ MPa$^{\frac{1}{2}}$ $\delta_p = 8.5$ MPa$^{\frac{1}{2}}$ $\delta_h = 10.4$ MPa$^{\frac{1}{2}}$ $\delta = 22.0$ MPa$^{\frac{1}{2}}$ If we define a quantity (r) as:

$r = [4(17.4 - \delta_d)^2 + (8.5 - \delta_p)^2 + (10.4 - \delta_h)^2]^{\frac{1}{2}}$ where $\delta_d$, $\delta_p$ and $\delta_h$ are the Hansen Parameters for a prospective solvent for polyaniline base, then suitable solvents are those for which r is less than about 7 MPa$^{\frac{1}{2}}$, more preferably less than about 6 MPa$^{\frac{1}{2}}$, and most preferably less than about 5 MPa$^{\frac{1}{2}}$.

Solvents for use in the practice of this invention are volatile. As used herein, a "volatile" solvent is a liquid which has a boiling point of equal to or less than about 300° C. under use condition, preferably at atmospheric or autogenous pressure. The lower limit to the boiling point is not critical provided that the solvent is in the liquid state under use conditions. In the preferred embodiments of the invention the boiling point of the solvent is less than about 250° C. Particularly preferred solvents have boiling points of less than about 200° C. More preferred solvents have boiling points of less than about 150° C. and most preferred solvents have boiling points of from about 40° C. to about 100° C.

Illustrative of useful solvents are alkyl alkanesulfonates such as methyl methanesulfonate, ethyl methanesulfonate, butyl methanesulfonate, propyl ethanesulfonate; nitriles such as acetonitrile, propionitrile, butyronitrile, benzonitrile, and the like; aromatic solvents such as nitrobenzene, benzene, toluene and the like; carbonates such as propylene carbonate, dimethyl carbonate, ethylene carbonate and the like; nitroalkanes such as nitromethane,, nitroethane, nitropropane, and the like; amides such as dimethylformamide, dimethyl thioformamide, diethyl formamide, N,N-dimethylacetamide, N,N-dimethylpropionamide, N-methylpyrrolidone, oxazolidone, pyrrolidone, 2-methyl-3-oxazolidone, 1,3-dimethyltetrahydro-2-pyrimidone, lactams such as capyrlactam, caprolactam and the like; organophosphorus compounds such as hexamethylphosphoramide, diethylphosphate, triethylphosphite, trimethyphosphate and the like; glycols such as tetraethylene glycol and the like; organosulfur compounds such as sulfolane, methyl sulfolane, dimethylsulfite, dimethylsulfone, dimethylsulfoxide, glycolsulfite, tetraethylsulfamide and the like; aliphatic and aromatic diamines and amines such as 2-picoline, 1-aminopiperidine, 4-picoline, pyrrolidine, piperidine, morpholine, ethylamine, benzylamine, butylamine, propylamine, ethylenediamine, propylene diamine, piperazine, pyridine, indoline, toluidine, quinoline, aniline, ethylenediamine, N,N-dimethylethylenediamine, tetrahydrofurylamine, N,N-dimethylethylenediamine, 2-methoxyethylamine, 3-methoxypropylamine 1,2,3,4-tetrahydroisoquinoline,tributylamine, dimethylamine, diethylamine, dipropylamine, dibutylamine, allylmethylamine, amylamine, isopropylamine, cyclohexylamine, phenylethylamine, 2-methylbenzylamine, 2-(ethylamino)ethanol, isobutylamine, tert-butylamine, 1-(3-aminopropyl)-2-pipecoline, 2,3-cyclohexenopyridine, 2-(methylamino)pyridine, 6-methylindole and the like, and other organonitrogen compounds such as dimethylhydrazine, tetramethylurea, 1,3-dimethyl-3-imidazolidinone, 4,4-dimethyl-2-imidazoline, 3,5-dimethylisoazole. Ethers such as tetrahydrofuran, 1,3-dioxane, dimethoxyethane and 1,3-dioxolane are also useful solvents.

Mixtures of such organic solvents can also be used as for example mixtures of 2-ethylaminoethanol and tetrahydrofuran, 2-(ethylamino)ethanol and 1,4-dioxane, tributylamine and N-methylpyrolidone, and the like. When employing mixtures of organic solvents or an excess of the Lewis base, an average set of Hansen Parameters can be calculated using the techniques of matrix algebra. Suitable solvent mixtures are then preferably those whose average values of $\delta_d$, $\delta_p$, and $\delta_h$ lead to a value of r which is less than about 7 MPa$^{\frac{1}{2}}$.

In addition to the essential polyaniline, and solvent, the solutions and plasticized composition of this invention can include other optional ingredients which either dissolve or do not dissolve in the solution and plasticized composition. For example, compounds which may be later activated to produce a dopant for the polyaniline may be included in the solutions and plasticized composition of the present invention. Such compounds include these which may be activated by radiation means such as electromagnetic radiation, electron beam radiation, heat and the like; by chemical means such as bases, acids, oxidants, and the like; and any other appropriate means. Such compounds include sulfonium and phosphonium salts, ammonium salts, and the like. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include salts such as, for example, LiCl, LiBr, $LiCF_3SO_3$, $KCF_3(CF_2)_2SO_3$, and the like which may be included to provide dopant counterions for the polyaniline or which may improve the solubility of the polyaniline or other additional conventional polymers. These other conventional polymers which may be present include, for example, polycarbonate, polyacrylonitrile, polyvinyl chloride, polyvinylidine fluoride, polyvinylidine chloride, polyvinyl alcohol, polyethylene oxide, polystyrene, nylon, cellulose poly(1,4-cyclohexylidene dimethylene terephthalate), poly(phenylene sulfide), poly(ethylene terephthalate), poly(4-aminobutyric acid), poly(hexamethylene adipamide), poly(p-phenylene terephthalamide), poly[methane bis(4-phenyl)carbonate], sulfonated polystyrene, sulfonated poly(2-methyl styrene), sulfonated poly(4-phenyl styrene), sulfonated poly($\alpha$-vinyl naphthalene), sulfonated poly(benzyl methacrylate), poly(acetate butyrate), polypropylene, polyethylene, cellulose acetate, polyphenylene oxide, polyvinyl acetate, and the like. In the case of nonsoluble fourth components, materials may be present which either fill or form a substrate for the conductive polymer cast from the solution. These fourth components include other conductive polymers, such as conjugated backbone polymers as for example poly(phenylene sulfide), polyacetylene, polyphenylene, polythiophene and the like which may become conductive upon doping, graphite, carbon blacks, metal conductors, reinforcing fibers and inert fillers (such as clays and glass).

The proportion of polymer and solvent in the solution or plasticized composition of this invention containing the substituted or unsubstituted polyaniline homopolymer or copolymer, is not critical and can vary widely, such that the composition varies from a solution to a plasticized composition. However, the following guidelines are believed important for achieving solutions and plasticized compositions particularly useful in the present invention. In general, the minimum amount of solvent as a proportion of the amount of solution is not believed to be critical, since any amount as a liquid will form at least a viscous gel or a plasticized composition with the polymer. These viscous gel embodiments of the invention are particularly useful for silk screening conductive circuitry and for applying thick film coatings on substrates. For other applications, it may be preferred, however, to use sufficient liquid solvent to lower the viscosity of the gel, composition or solution to a point where it flows at least sufficiently to conform to a container shape or mold in a reasonably short period of time, e.g., in 30 minutes or less. The maximum amount of solvant is again not critical, but it is recognized that additional solvent will lower viscosity and thereby effect processibility. Excess solvent will also lenghten drying time. Preferably, the solvent is present in sufficient amounts to lower the viscosity of the solution to less than about 10,000 centipoise or preferably to from about 1 to about 1000 centipoise.

The method of forming the solutions or plasticized compositions of this invention is not critical and can vary widely. For example, one preferred method of forming the present composition or solution containing the substituted or unsubstituted polyaniline is to add the polyaniline in powdered form to a suitable solvent such as pyrrolidine, morpholine and the like in a mixing vessel using conventional mixing means as for example shaking, ultrasonics, stirring and the like. In use, the solution or plasticized composition can be placed in the desired configuration. As the solvent is removed, the polyaniline solidifies forming solid polyaniline in the desired configuration.

Various methods are contemplated for using the solution of the present invention. The solvent can be removed from the solution through use of any conventional solvent removal method but is removed preferably by evaporation to form a solid polyaniline. Alternatively, the solvent can be removed by extraction with an extractant in which the solvent is substantially more soluble than the doped polymer.

A will be appreciated by those skilled in polymer processing, the ability to form polymer articles by removing a solvent from a solution or plasticized composition enables one to prepare articles of a wide variety of shapes and sizes. Thus, for example, by removing volatiles from the present solution or plasticized composition spread on a surface, films of any desired thickness can be prepared Even extremely thin films can be prepared which are substantially transparent. By extruding the solution or plasticized composition through a die, fibers or films can be made. Similarly, by removing volatiles from the solution or plasticized composition in a mold of various shapes, shaped articles conforming in shape to the mold can be prepared. It will be appreciated that some shrinkage might occur between the solution or plasticized composition in its last flowable state to the final article, but such shrinkage is conventionally accounted for in molding polymers from solution. It is also contemplated that, once a solution or plasticized composition is formed, a partial or substantial removal of solvent will occur prior to placing the solution or plasticized composition on a surface or in a mold, with the final removal of solvent occurring on the surface or in the mold. It is contemplated that, if additional soluble components are introduced into the solution, they will, unless also volatile, be present in the formed article. If the additional component is a non-volatile liquid, then the removal of volatile components may leave a new liquid or plasticized form of undoped neutral polymer. If the additional components are volatile, then foamed or expanded cellular forms of the polymer may be formed.

In the event that the fourth or additional non-soluble components are present (or suspended) in the solution, the doped polymer will form around, or be filled with, the insoluble material. If, for example, the additional components are glass fibers, depending on the relative amounts of fibers and doped polymer, the removal of the solvent will cause either the polymer to be fiber-filled, or the fibers to be polymer coated or impregnated, or some intermediate composite of fibers and doped polymer to be formed. In the case of systems wherein the amount of non-soluble component greatly exceeds the doped polymer remaining, individual particles or shapes of non-soluble components coated or impregnated with doped polymer will be formed.

The neutral polyaniline can be rendered conductive by doping. Dopants for use in the practice of this invention can vary widely and can be such materials which are known in the art for use in doping conjugated backbone polymers to form conductive or semiconductive polymers, as for example, those described in detail in U.C. Patent Nos. 4,442,187 and 4,321,114 which are hereby incorporated by reference. Illustrative of useful dopant species are oxidizing dopants. Oxidizing dopants are well known in the conductive polymer art, and any of such known oxidizing dopants can be used. Illustrative of useful oxidizing dopants are $AsF_5$, $MoOCl_4$, $MoCl_5$, $PCl_5$, $POCl_3$, $PCl_3$, $AlCl_3$, $NO^+$ and $NO_2^+$ salts (such as $NOBF_4$, $NOPF_6$, $NOSbF_6$, $NOAsF_6$, $NOCH_3CO_2$, $NO_2BF_4$, $NO_2PF_6$, $NO_2AsF_6$, $NO_2SbF_6$, and $NO_2CF_3SO_2$), $HClO_4$, $HNO_3$, $H_2SO_4$, benzoylperoxide, $SO_3$, $Br_2$, $(FSO_3)_2$, $FSO_3H$, and Fe(III) salts (such as $Fe(BF_4)_3$, $FeBr_3$, $Fe(CH_3SO_3)_3$, $Fe(ClO_4)_3$, $FeCL_3$, $Fe(OTs)_3$, and $Fe(CF_3SO_3)_3$ which give rise to doped polymers containing dopant solutes such as $NO_3^-$, $CH_3SO_3^-$, $AlCl_4^-$, $BF_4^-$, $PCl_4^-$, $PF_6^-$, $AsF_6^-$, $SbF_6^-$, $CF_3SO_3^-$, $ClO_4^-$, $OTs^-$, $SO_3^-$, $C_6H_5CO_2^-$, $CH_3SO_3^-$, $FSO_3^-$, and $FeCl_4^-$. Other useful oxidizing dopants include electrolyte salts such as $LiClO_4$, $LiBF_4$, $LiAsF_6$, $NaPF_6$, $Bu_4NClO_4$, $Bu_4NOTs$, $Bu_4NCF_3SO_3$, $LiCF_3SO_3$, $AgOTs$, and the like. Preferred oxidizing dopants for use in the practice of this invention are oxidizing dopants selected from the group consisting of $MoOCl_4$, $MoCl_5$, $PCl_5$ and Fe (III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, and Fe (III) salts such as $Fe(ClO_4)_3$, $FeCl_3$, $FeBr_3$, and $Fe(CF_3SO_3)_3$, and particularly preferred oxidizing dopants for use in the practice of this invention are dopants selected from the group consisting of $MoOCl_4$, $MoCl_5$, and $FeCl_3$. Amongst these particularly preferred embodiments, most preferred oxidizing dopants are those embodiments in which the oxidizing dopant is $FeCl_3$.

Illustrative of still other dopants are protonic acid dopants. Such dopants include inorganic acids such as hydrofluoric acid, hydriodic acid, hydrochloric acid, phosphoric acid, nitric acid, boric acid, fluoroboric acid, sulfuric acid, and the like.

Illustrative of still other useful dopants are protonic acids or acid derivatives thereof such as those containing anionic moieties of the formula:

and having one or more cationic moieties selected from the group consisting of:

wherein:
R$_4$ is the same or different at each occurrence and is an organic radical or amino group;
M is a species having a positive charge equal to s with the proviso that at least one of M is a proton (H$^+$);
s is a positive integer equal to or greater than 1, preferably from 1 to about 8; and
r is the same or different at each occurrence and is 0 or a positive integer equal to or greater than 1, with the proviso that at least one of r is other than 0.

The R$_4$ group may vary widely and can be amine or a substituted or unsubstituted aliphatic radical such as alkyl, nitroalkyl, alkylamine, dialkylamine, perfluoroalkyl, alkoxyalkyl, alkoxy, haloalkyl and the like, or a substituted or unsubstituted aromatic radical such as phenyl, indanyl, benzyl, biphenyl, benzhydryl, halophenyl, nitrophenyl, anthracyl, naphthyl, phenylamine, diphenylamine, phenanthryl and the like, or a substituted or unsubstituted heteroaromatic or heteroaliphatic radical such as pyrrolidyl, piperidyl, benzofuryl, benzopyranyl, carbazoyl, triazyl, imidazolyl, isoxazolyl as the like. R$_4$ may also be a polymeric or oligomeric radical such as a polymer having recurring pendant phenyl groups in the polymeric backbone substituted with sulfonic acid and derivatives thereof such as salts, phosphoric acid and derivatives thereof such as salts, phosphonic acid and derivatives thereof such as salts, sulfinic acid and derivatives thereof such as salts, carboxylic acid and derivatives thereof such as salts, boric acid and derivatives thereof such as salts, or phosphonic acid and derivatives thereof such as salts; moieties such as sulfonated or phosphonated polystyrene, poly(2-methylstyrene), poly(4-phenylstyrene), poly(2-vinyl naphthalene), poly(vinyl benzoate), poly(benzyl methacrylate) and the like. In the particularly preferred embodiments of the invention, R$_4$ is an aromatic radical and in the most preferred embodiments R$_4$ is substituted or unsubstituted phenyl or naphthyl. The nature of the $M^{+n}$ group may vary widely. For example, $M^{+n}$ may be be a non-metal cation such as $Bu_4N^+$, $H^+$, $NO^+$, $NO_2^+$, $NH_4^+$ and the like, or may be a metal cation such as $Na^+$, $Li^+$, $Ag^+$, $Ba^{+2}$, $Co^{+3}$, $Al^{+3}$, $Fe^{+3}$ and the like.

Preferred for use in the practice of this invention are organic acid dopants, more preferably totally or partially protonized forms of those having anionic portions of the formulas:

where R$_1$ and r are as described above.

More preferred for use as dopants in the practice of this invention are acids or acid derivatives of the formula:

wherein:
M is a metal or a proton or other non-metal cation with the proviso that at least one of M is a proton (H$^+$);
c is 0, 1, 2, 3 or 4;
d is 0, 1 or 2;
e is 0, 1 or 2;
f is 0, 1 or 2;
g is 0, 1 or 2, with the proviso that at least one of c, d, f and g is other than 0; and
R$_5$ and R$_6$ are the same or different and are nitro, cyano, hydroxy, halo, amido, sulfinic acid, amino, alkylamino, dialkylamino, arylamino, diarylamino, sulfinate, phosphonic acid, phosphonate, phosphinic acid, phosphinate, alkylarylamino, substituted or unsubstituted alkoxy, alkoxyalkyl, aryl or alkyl having from 1 to about 30 carbon atoms wherein permissible substituents include perhaloalkyl, phenyl, alkoxy, halo, cyano, sulfate, haloalkyl, hydroxy, sulfonate, sulfonic acid, phosphate, phosphoric acid, boric acid, sulfinate, borate, phosphonic acid, phosphonate, phosphinic acid, phosphinate, sulfinic acid, quaternary ammonium, carboxylic acid, nitro, carboxylate and the like, or any two $R_5$ or $R_6$ may form an alkylene, alkynylene or alkenylene chain completing aromatic, heteroaromatic, alicyclic or heteralicyclic ring a fused-ring system which chain may include one or more oxygen, nitrogen, ester, sulfur, carbonyl or a combination thereof and/or which chain may be unsubstituted or substituted with one or more halo, phosphoric acid, hydroxy, boric acid, amino, alkylamino, dialkylamino, arylamino, alkyl diarylamino, alkylarylamino, nitro, cyano, sulfinate, phosphoric acid, sulfinic acid, phosphate, amido, alkoxy, carboxylate, phosphonic acid, phosphonate, sulfonate, borate, sulfonic acid or carboxylic acid groups, or $R_5$ or $R_6$ is a moiety of the formula:

wherein:

q is a positive whole number from 1 to about 10; and

In the particularly preferred embodiment of this invention, useful dopants are acids of the above formula:

$R_5(BO_2M_2)_g(PO_3M_2)_f(SO_3M)_c(CO_2M)_d$ or wherein:
c is 0, 1, 2 or 3;
d is 0 or 1;
e is 0 or 1;
f is 0 or 1;
g is 0 or 1, with the proviso that at least one of c, d, f and g is other than 0;
$R_5$ or $R_6$ are the same or different and are amino, alkylamino, dialkylamino, arylamino, diarylamino, arylalkylamino, alkyl, halo, hydroxy, aryl, phenyl, haloalkyl, perhaloalkyl, cyano, nitro, alkoxy, boric acid, borate, phosphonate, phosphonic acid, carboxylate, sulfonate, phosphate, sulfonic acid, carboxylic acid, phosphoric acid, sulfinic acid, sulfinate or substituted or unsubstituted aryl alkyl wherein permissible substituents are selected from the group consisting of amino, alkylamino, dialkylamino, arylamino, diarylamino, arylalkylamino, alkyl, halogen, hydroxy, phenyl, haloalkyl, amido, perhaloalkyl, cyano, nitro, alkoxy, boric acid, borate, phosphonate, phosphonic acid, carboxylate, phosphinic acid, sulfonate, phosphate, sulfonic acid, carboxylic acid, phosphinate, phosphoric acid, sulfinic acid or sulfinate or any $R_5$ or $R_6$ may form an unsubstituted or substituted alkenylene chain completing a naphthalene, anthracene or phenanthracene fused ring system or $R_5$ or $R_6$ is a moiety of the formula:

wherein:
q is a positive whole number from 1 to about 10;
M is a cation such as $NO^+$, $NO_2^+$, $Fe(III)$, $H^+$, $Pb(IV)$, $Ce(IV)$, $Al(III)$, $Sr(IV)$, $Cr(VI)$, $Mn(VII)$, $Co(III)$, $Au(III)$, $Os(VIII)$, $Na(I)$, $Li(I)$, $K(I)$ or $Bu_4N(I)$ with the proviso that at least one of M is a proton ($H^+$).

In the most preferred embodiments of this invention, useful dopants are acids of the formula:

$R_5(SO_3M)_c(CO_2M)_d$ or wherein:
c is 1, 2 or 3;
d and e are the same or different and are 0 or 1;
$R_5$ and $R_6$ are the same or different and are fluoro, alkoxy, amino, biphenyl, alkylamino, arylamino, dialkylamino, diarylamino, alkylarylamino, hydroxy, nitro, cyano, alkyl, phenyl, alkyl or phenyl substituted with one or more alkyl, alkoxy, fluoro, fluoroalkyl, sulfonic acid, sulfonate, perfluoroalkyl, carboxylate, hydroxy, nitro, cyano, or carboxylic groups or any $R_5$ or $R_6$ may form an unsubstituted or substituted alkenylene chain completing a naphthalene, anthracene or phenanthracene fused system which may be substituted with one or more alkyl, alkoxy, fluoro, perfluoroalkyl, fluoroalkyl, sulfonic acid, sulfonate, carboxylic acid, carboxylate, hydroxy, nitro or cyano groups; and
M is a cation with the proviso that at least one of M is a proton.

The following is a listing of dopants which are useful in the practice of the most preferred embodiments of this invention for formation of the dopant solute.
1-anthracene sulfonic acid,
9-anthracene sulfonic acid,
2-Phenanthrene sulfonic acid,
3-phenanthrene sulfonic acid,
9-phenanthrene sulfonic acid,
$NO_2CF_3SO^-_3$,
$CF_3SO_3H$,
perflouro octyl sulfonic acid
perfluoro octyl carboxylic acid
octylsulfonic acid,
dodecylsulfonic acid,
cetylsulfonic acid,
toluenesulfonic Acid (TsOH),
$Fe(OTs)_3$,
$Fe(CH_3SO_3)_3$,
$(FSO_3)_2$,
AgOTs,
$Me_3SiOTs$,
dodecylbenzene sulfonic acid, naphthalene sulfonic acid,
benzene disulfonic acid,
benzene sulfonic acid,
1,3-benzene disulfonic acid,
2,5-dihydroxy-1,4-benzene disulfonic acid,
camphor sulfinic acid
naphthalene trisulfonic acid
dodecylbenzene sulfonic acid,
isoethionic acid,
1,5-naphthalene disulfonic acid,
nickel phthalocyanine tetrasulfonic acid,
phenyl phosphonic acid,
poly(vinyl sulfonic acid),
3-sulfopropyl acrylate,
3-sulfopropyl methacrylate,
sulfamic acid,
5-sulfosalicyclic acid,
(4,5-dihydroxy-1,3-benzene disulfonic acid),
vinyl sulfonic acid,
sulfanilic acid,
4-sulfophthalic acid,
sulfoacetic acid,
methyl orange,
sulfonated polystyrene,
sulfonated poly(α-vinyl naphthalene),
naphthol yellow,
naphthol blue black,
1,2-naphthoquinone-4-sulfonic acid,
naphthylazoxine S,
1-octane sulfonic acid,
t-butyl phosphonic acid,
ethyl phosphonic acid,
butyl phosphonic acid,
1,2-benzene disulfonic acid,
4-octylbenzene sulfonic acid,
2-mesitylene sulfonic acid,
2,6-naphthalene disulfonic acid,
2-naphthalene sulfonic acid,
1,3,6-naphthalene trisulfonic acid,
1,3,7-naphthalene trisulfonic acid,
sulfonazo III acid,
biphenyl disulfonic acid,
biphenyl sulfonic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
6,7-dihydroxy-2-naphthalene sulfonic acid,
1-naphthalene phosphoric acid,
1-naphthalene sulfonic acid,
1-naphthalene-5,7-dinitro-8-hydroxy sulfonic acid,
1-naphthalene-4-hydroxy sulfonic acid,
4-bromo benzene sulfonic acid,
4-hydroxy-5-isopropyl-2-methyl
benzene sulfonic acid
3,4-diamino benzene sulfonic acid
benzenephosphoric acid,
1,3,5-benzene trisulfonic acid,
2-methyl-5-isopropyl benzene sulfonic acid,
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-napthalene-1-hydroxy sulfonic acid,
4-phenylamino benzene sulfonic acid,
1,6-naphthalene disulfonic acid,
1,5-naphthalene disulfonic acid,
1,3-naphthalene-7-hydroxy disulfonic acid, and
$Me_3SiOSO_2CF_3$.

The amount of dopant included in the complex is not critical and may vary widely. In general, sufficient dopant is included in the complex such that an amount of dopant is released from the complex on removal of the Lewis based and/or solvent from the complex and/or from the solution and/or composition such that the polyaniline is doped the desired extent, usually an amount such that the polyaniline is doped to a conductivity of at least about $10^{-10}$ ohm$^{-1}$cm$^{-1}$. The upper level of conductivity is not critical and will usually depend on the type of aniline polymer employed. In general, the highest level of conductivity obtained is provided without unduly adversely affecting the environmental stability of the polymer. In the preferred embodiments of the invention the amount of dopant employed is sufficient to provide a conductivity of at least about $10^{-6}$ohm$^{-1}$cm$^{-1}$ and in the particularly preferred embodiments is sufficient to provide a conductivity of from about $10^{-4}$ohm$^{-1}$cm$^{-1}$ to about $10^{+2}$ohm$^{-1}$cm$^{-1}$. Amongst these particularly preferred embodiments, most preferred are those embodiments in which sufficient dopant is employed to provide a conductivity of at least about $10^{-1}$ohm$^{-1}$cm$^{-1}$ to about $10^{+2}$ohm$^{-1}$cm$^{-1}$, with amounts sufficient to provide a conductivity from about $10^{0}$ohm$^{-1}$cm$^{-1}$ to about $10^{+2}$ohm$^{-1}$cm$^{-1}$ usually being the amounts of choice.

Examples of articles formed from non-soluble components and the present polymer solutions include conductive polymer coated-housings for sensitive electronic equipment (microprocessors), infrared and microwave absorbing shields, flexible electrically conducting connectors, conductive bearings, motor or generator brushes and semiconducting junctions photoconductors, conductive traces or ground planes for electronic devices, antistatic materials for packaging electronic components, carpet fibers, tiles, or coatings for floors in computer rooms and antistatic spray finishers for plastics, and thin, optically transparent antistatic finishes for CRT screens, aircraft, auto windows and the like.

The following specific examples are present to illustrate the invention and are not to be construed as limitations thereon.

EXAMPLE 1

To a solution containing 1770 ml of $H_2O$, 50g of aniline (0.54 mole) and 172 g p-toluene sulfonic acid (0.90 mole) was added, dropwise at 15° C., a solution of ammonium persulfate (153.4 g in 336.5 ml $H_2O$) over a period of 40 minutes. Then the reaction was allowed to continue at 15° C. for a 0.5 hours.

The resultant solid precipitate was collected and washed with 6 L of an aqueous toluene sulfonic acid solution (10 wt%) and then by 3 L of methanol. The resultant blue-black solid was dried in air for 25 hrs and dried at 130° C. for 3 hrs. under dynamic vacuum to give poly(anilinium tosylate) as a green powder. The conductivity of the dried and pressed pellet formed from this material was 1 Scm$^{-1}$ as measured by the co-linear four-probe method. The conductivity of the moisture-saturated pellet was 20 Scm$^{-1}$.

The yield was 78 g. The intrinsic viscosity (in $H_2SO_4$, at 25° C.) was 0.66 dl/g. Elemental analysis of the dried green powder gave:
C:64.37(Wt%), H:4.86%, N:8.59%,
S:8.40%, O:13.51%, Moisture: less than 0.8 wt%.

EXAMPLE 2

Poly(anilinium tosylate) (13 g) obtained from Example 1 was suspended in water at room temperature and nuetralized with excess sodium carbonate ($Na_2CO_3$). The suspension was then filtered and the cake was dried to yield a blue-black powder of polyaniline base.

EXAMPLE 3

Calculations were carried out to suggest suitable solvents for use with unsubstituted undoped polyaniline using group additive contributions for determining individual components of the Hildebrand Parameter ($\delta$). In the representations of Hansen, the following nomenclature is used

A) Nomenclature (1) $\delta$ is the Hildebrand Parameter (units: $MPa^{\frac{1}{2}}$) and is related to the Hansen Parameters ($\delta_d$, $\delta_p$, $\delta_h$) as follows:

$$\delta^2 = \delta_t^2 = \delta_d^2 + \delta_p^2 + \delta_h^2$$

(2) $\delta_d$ is the contribution from dispersion interactions.
(3) $\delta_p$ is the contribution from polar interactions.
(4) $\delta_h$ is the contribution from hydrogen bonding interactions.

These components of $\delta$ can be estimated from tabulated group molar attraction contributions from dispersion interactions ($F_d$), polar interactions ($F_p$) and from the cohesive hydrogen bonding energy ($U_h$). This analysis led to the estimate for the solubility parameter of the undoped (base) form of polyaniline given below:

$\delta_d = 18.5$ $MPa^{\frac{1}{2}}$
$\delta_p = 4.1$ $MPa^{\frac{1}{2}}$
$\delta_h = 7.4$ $MPa^{\frac{1}{2}}$
$\delta = (\delta_d^2 + \delta_p^2 + \delta_h^2)^{\frac{1}{2}} = 20.3$ $MPa^{\frac{1}{2}}$ Estimate of the Hildebrand Parameter based on group contributions to the heat of vaporization gave $\delta = 23.8$ $MPa^{\frac{1}{2}}$. Solvents which dissolve or swell undoped polyaniline will be those whose own solubility parameters are close to those of the polymer. Polar solvents with relatively strong hydrogen bonding are generally good solvents.

EXAMPLE 4

Figure 1:
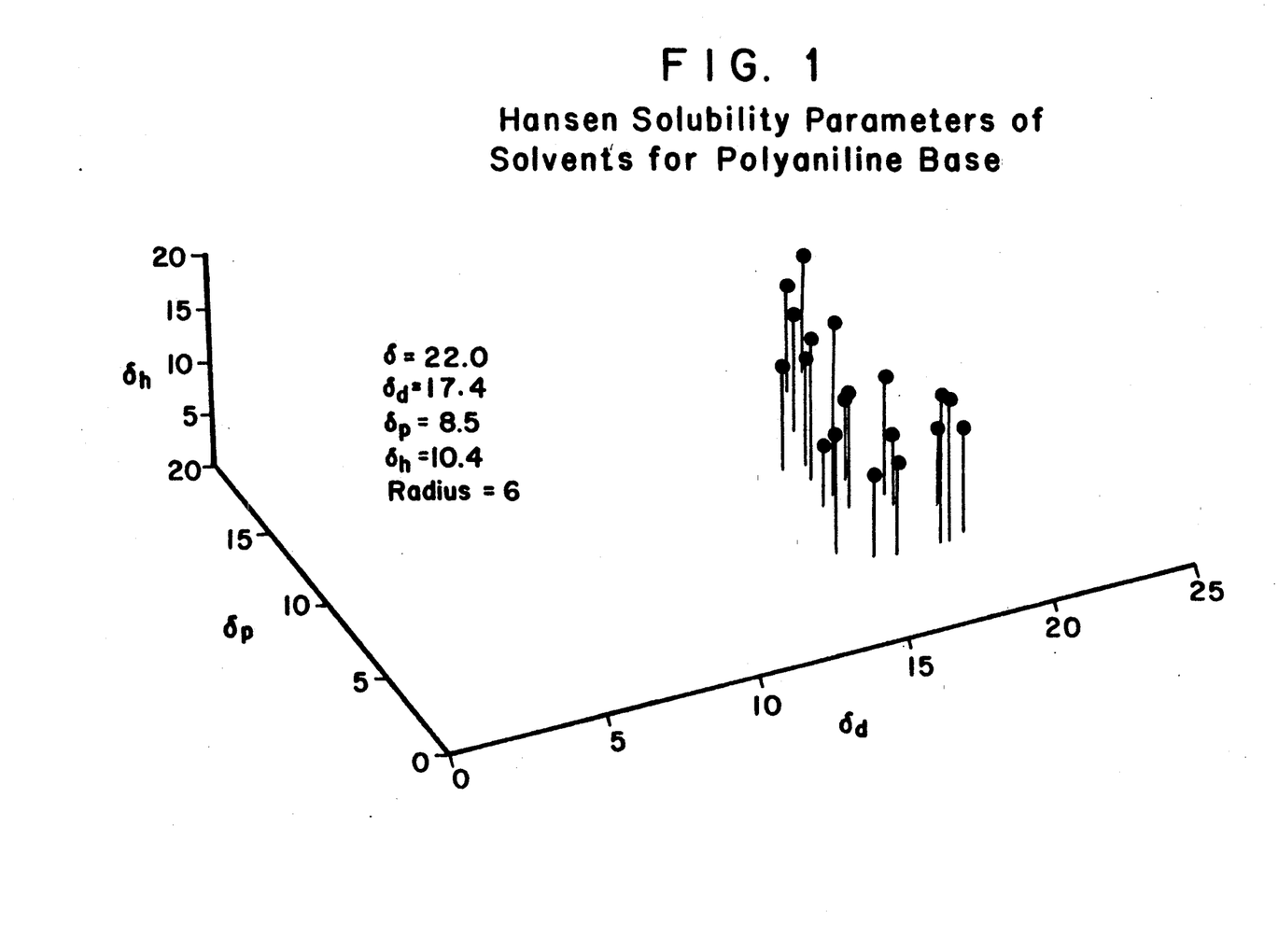
FIG. 1 shows a graph showing the Hansen Solubility Parameters of solvents and co-solvents for polyaniline base.

A series of potential solvents with significant polar and hydrogen bonding contributions were tested with undoped polyaniline base which had been synthesized as in Example 2. Solvents which were demonstrated to dissolve undoped polyaniline are shown in Table 1 below and in FIG. 1.

TABLE 1

| | Observed Solvents For Unsubstituted Undoped Polyaniline Base | | | | |
|---|---|---|---|---|---|
| Liquid | BP (°C.) | $\gamma w$ | $\epsilon$ | $\mu$ | $\delta$ |
| Morpholine | 129 | 200.0 | 7.3 | 5.0 | 22.1 |
| Piperidine | 106 | 89.0 | 5.8 | 4.0 | 19.3 |
| Pyridine | 115 | 80.0 | 12.3 | 7.3 | 21.7 |
| Pyrrolidine | 88 | — | — | 5.3 | — |
| N-methyl pyrrolidone | 204 | — | 32.0 | — | 23.7 |
| Dimethylsulfoxide | 189 | 79.0 | 46.5 | 13.3 | 26.4 |
| Dimethylformamide | 158 | 68.0 | 37.0 | 11.2 | 24.1 |
| Dimethylhydrazine | 63 | — | — | — | 19.8 |
| Propylamine | 48.5 | — | 5.3 | 4.7 | 19.7 |
| Butylamine | 78 | — | 5.3 | 4.7 | 18.6 |
| Picoline | 129 | — | 9.8 | 6.3 | 20.9 |
| Aniline | 182 | 94.0 | 6.9 | 5.0 | 22.6 |

TABLE 1-continued

| | Observed Solvents For Unsubstituted Undoped Polyaniline Base | | | | |
|---|---|---|---|---|---|
| Liquid | BP (°C.) | $\gamma w$ | $\epsilon$ | $\mu$ | $\delta$ |
| Quinoline | 114 | — | 9.0 | 7.6 | 22.0 |
| 2-Pyrrolidone | 245 | — | — | 7.7 | 28.4 |
| Dimethylacetamide | 165 | 87.0 | 38.0 | 12.7 | 22.7 |
| Tetramethylurea | 177 | — | 23.1 | 13.0 | 21.7 |
| Ethylene Diamine | 117 | — | 12.9 | 6.6 | 25.3 |
| Hexamethyl Phosphoramide | 235 | — | 30.0 | 17.6 | 23.2 |
| m-Cresol | 203 | — | 11.8 | — | 22.7 |
| Benzyl alcohol | 206 | — | 13.0 | 5.5 | 23.5 |
| Benzylamine | 185 | — | — | — | — |
| 2-Methoxyethylamine | 90 | — | — | — | — |

"—" means that the data is not available.

The parameters listed in Table 1 are as follows: "B.P." is the boiling point in °C.; "$\gamma_w$" is the relative sound velocity in paper wetted by the solvent (water=100) which is a measure of hydrogen bonding capability; "$\epsilon$" is the dielectric constant relative to the permittivity of free space ($\epsilon_0 = 8.854 \times 10^{-12}$ F/m); "$\mu$" is the dipole moment in $10^{-30}$ Cm, and "$\delta$" is the Hildebrand (solubility) parameter in $MPa^{\frac{1}{2}}$. It was noted that in cases where it was known, the hydrogen bonding parameter, $\gamma_w$, was equal to or greater than 68, and the dipole moment was equal to or greater than $4.7 \times 10^{-30}$ Cm. The data were used to establish an empirical measure of the solubility parameters which characterize the interactions of undoped polyaniline according to a method developed by Hansen. Values of the Hansen parameters for the solvents used were taken from "Handbook of Solubility Parameters and other Cohesive Parameters" by A.F.M. Barton (CRC Press, 1983). When multiple literature sources were found with widely differing Hansen parameter values, those sets of values were taken which were the closest to those theoretically predicted by group additive techniques for the given solvent.

B) Hansen s Method for Solubility Parameter (1) In this method, the polymer is characterized as having a "solubility sphere" in a three dimensional space defined by the coordinates $\delta_d$, $_p$, $\delta_h$. The center point of the solubility sphere is ($2\delta'_d$, $\delta'_p$, $\delta'_h$) and the radius of the sphere is R.

(2) An interaction distance for a given solvent is defined as:

$$r = [4(\delta_d - \delta'_d)^2 + (\delta_p - \delta'_p)^2 + (\delta_h - \delta'_h)^2]^{\frac{1}{2}}$$

(3) The polymer should be soluble in a given solvent when $r < R$.

C) Hansen Method with Polyaniline and Various Solvents (1) The following values of the Hansen Parameters (all in units of $MPa^{\frac{1}{2}}$) were determined for polyaniline by sampling Hansen Space (i.e., the range of possible values for $\delta_d$, $\delta_p$ and $\delta_h$) with the series of solvents in Table 1.
 (i) $\delta'_d = 17.4$
 (ii) $\delta'_p = 8.5$
 (iii) $\delta'_h = 10.4$
 (iv) R = 6
 (v) $\delta = 22.0$ The following Table 2 sets forth the Hansen Parameters of various liquids which have been shown to be solvents for unsubstituted and undoped polyaniline base.

TABLE 2

Hansen Parameters of Solvents For Unsubstituted Undoped Polyaniline Base

| Liquid | $\delta_d$ | $\delta_p$ | $\delta_h$ | r |
|---|---|---|---|---|
| Morpholine | 16.0 | 11.4 | 10.1 | 4.0 |
| Piperidine | 16.2 | 8.7 | 5.8 | 5.2 |
| Pyridine | 17.6 | 10.1 | 7.7 | 3.2 |
| Dimethylsulfoxide | 18.4 | 16.4 | 10.2 | 8.2 |
| N-methylpyrrolidone | 16.5 | 10.4 | 13.5 | 4.1 |
| Dimethylformamide | 17.4 | 13.7 | 11.3 | 5.3 |
| Dimethylhydrazine | 15.3 | 5.9 | 11.0 | 5.0 |
| Propylamine | 17.0 | 4.9 | 8.6 | 4.1 |
| Butylamine | 16.2 | 4.9 | 8.0 | 4.9 |
| Picoline | 18.2 | 7.8 | 6.8 | 4.0 |
| Aniline | 19.4 | 5.1 | 10.0 | 5.3 |
| Quinoline | 19.4 | 7.0 | 7.6 | 5.1 |
| 2-Pyrrolidone | 19.4 | 17.4 | 11.3 | 9.8 |
| Dimethylacetamide | 16.8 | 11.5 | 10.2 | 3.2 |
| Tetramethylurea | 16.8 | 8.2 | 11.1 | 1.4 |
| Ethylene Diamine | 16.6 | 8.8 | 17.0 | 6.8 |
| Hexamethyl Phosphoramide | 18.3 | 8.6 | 11.3 | 2.0 |
| m-Cresol | 18.7 | 4.8 | 13.5 | 5.5 |
| Benzylalcohol | 18.5 | 4.9 | 13.9 | 5.5 |

The average values of the Parameters, $\delta_d$, $\delta_p$ and $\delta_h$, in Table 2 determine the approximate center of the solubility sphere ($2\delta'_d$, $\delta'_p$, $\delta'_h$) and the span of r values determine the approximate radius.

(2) Examples:
(i) Methanol:

$\delta_d = 11.60$, $\delta_p = 13.0$, $\delta_h = 24.0$ $r = [4(16 - 17.4)^2 + (13 - 8.5)^2 + (24 - 10.4)^2]^{\frac{1}{2}} = 18.4$ Since $r >> R$, methanol should be a nonsolvent which was observed.

(ii) Methyl Ethyl Ketone (MEK):

$\delta_d = 14.1$, $\delta_p = 9.3$, $\delta_h = 9.5$ $r = [4(14.1 - 17.4)^2 + (9.3 - 8.5)^2 + (9.5 - 10.4)^2]^{\frac{1}{2}} = 6.7$ Since $r > R$, methylethylketone should not be a solvent. It was found in accordance with the prediction that although methylethylketone swells undoped polyaniline it does not dissolve it to a noticeable degree.

(ii) Piperidine:

$\delta_d = 16.2$, $\delta_p = 8.7$, $\delta_h = 9.5$ $r = [4(16.2 - 17.4)^2 + (8.7 - 8.5)^2 + (5.8 - 10.4)^2]^{\frac{1}{2}} = 5.2$ Since $r > R$, piperidine should be a solvent which was observed.

EXAMPLE 5

A number of prospective solvents were examined and found to be non-solvents for undoped polyaniline. These non-solvents are summarized in the following Table 3 along with the predicted interaction distance (r) of the Hansen Method.

TABLE 3

Non-Solvents of Polyaniline Tosylate and Polyaniline Base Non-Solvents

| Non-Solvent | $\gamma_w$ | $\mu_p$ | $\delta$ | $\delta_d$ |
|---|---|---|---|---|
| Acetonitrile | | 11.2 | 24.4 | 15.3 |
| Dipropylamine | — | — | 16.3 | 14.0 |
| Triethylamine | — | 2.2 | 15.3 | 14.6 |
| Tributylamine | — | 2.3 | 15.9 | 15.1 |
| Diisopropylamine | — | — | 15.2 | 13.8 |
| Cyclohexanone | 38.0 | 9.3 | 20.2 | 17.7 |
| Methylene Chloride | — | 5.0 | 20.2 | 13.4 |
| Chloroform | — | 6.2 | 18.7 | 11.0 |
| Methylethylketone | 31.0 | 9.0 | 19.3 | 14.1 |
| Tetrahydrofuran | 32.0 | 5.4 | 18.5 | 13.3 |
| 1,4-Dioxane | 46.0 | 0.0 | 19.8 | 18.3 |
| 1,3-Dioxolane | — | — | 23.2 | 14.8 |
| Diethyl Ether | 24.0 | 3.8 | 15.6 | 14.4 |
| Methanol | 72.0 | 5.7 | 29.7 | 11.6 |
| Ethanol | 38.0 | 5.6 | 26.1 | 12.6 |
| Acetone | 29.0 | 9.1 | 19.7 | 13.0 |
| Water | 100.0 | 6.1 | 47.9 | 12.3 |
| N-Ethylaniline | — | — | 21.5 | 17.1 |
| 4-Butylaniline | — | — | 20.4 | 16.9 |
| Toluene | 27.0 | 1.2 | 18.2 | 17.9 |
| Hexane | 24.0 | 0.3 | 14.9 | 14.9 |
| Nitrobenzene | — | 14.1 | 22.5 | 17.6 |
| Ethyl Acetate | 29.0 | 6.0 | 18.2 | 13.4 |
| 2-(Ethylamino)ethanol | — | — | — | — |
| 1,3-Dioxane | — | — | — | — |

| Non-Solvent | $\delta_p$ | $\delta_h$ | r |
|---|---|---|---|
| Acetonitrile | 18.0 | 6.1 | 11.2 |
| Dipropylamine | 6.2 | 5.8 | 8.5 |
| Triethylamine | 3.7 | 1.9 | 11.3 |
| Tributylamine | 2.8 | 4.0 | 9.7 |
| Diisopropylamine | 6.2 | 2.0 | 11.3 |
| Cyclohexanone | 8.9 | 5.1 | 5.3 |
| Methylene Chloride | 11.7 | 9.6 | 8.7 |
| Chloroform | 13.7 | 6.3 | 14.4 |
| Methylethylketone | 9.3 | 9.5 | 6.7 |
| Tetrahydrofuran | 11.0 | 6.7 | 9.3 |
| 1,4-Dioxane | 1.3 | 7.4 | 8.0 |
| 1,3-Dioxolane | 11.3 | 13.9 | 6.9 |
| Diethyl Ether | 2.9 | 5.1 | 9.8 |
| Methanol | 13.0 | 24.0 | 18.4 |
| Ethanol | 11.2 | 20.0 | 13.8 |
| Acetone | 9.8 | 11.0 | 8.9 |
| Water | 31.3 | 34.2 | 34.5 |
| N-ethylaniline | 10.5 | 7.7 | 3.4 |
| 4-butylaniline | 9.1 | 6.6 | 4.0 |
| Toluene | 1.1 | 2.1 | 11.2 |
| Hexane | 0.0 | 0.0 | 14.3 |
| Nitrobenzene | 14.0 | 0.0 | 11.8 |
| Ethyl Acetate | 8.6 | 8.9 | 8.1 |
| 1,3-Dioxane | — | — | — |
| 2-(Ethylamino)ethanol | — | — | — |

In the table, "—" denotes that the data is not available.

Figure 2:
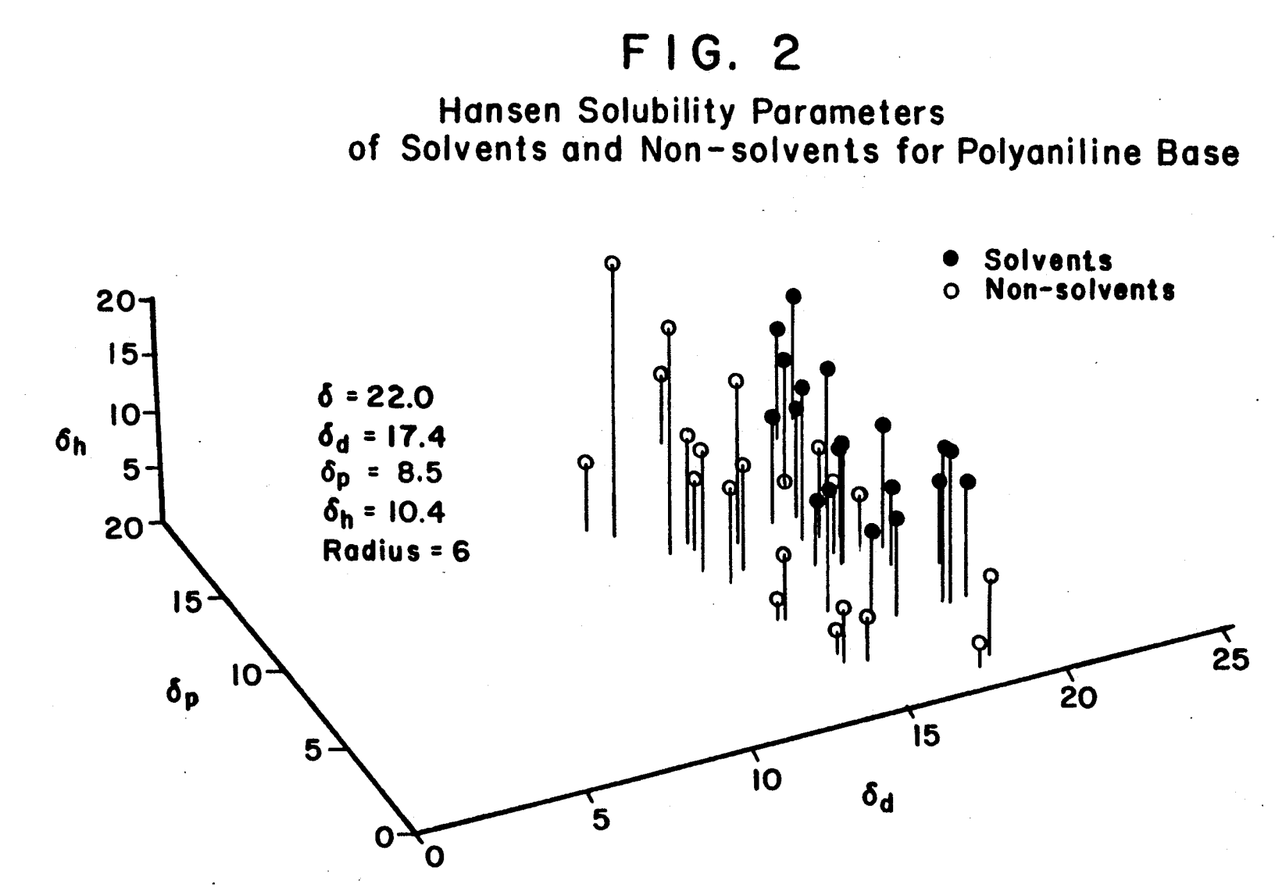
FIG. 2 is a graph showing the Hansen Solubility Parameters relative to polyaniline base for solvents and non-solvents.

The Hansen Parameters of these non-solvents are graphically compared to those for the solvents of Example 4 in FIG. 2. The majority of non-solvents in Table 3 have as expected, $r > R$ ($R \approx 6$ from Example 4); however, there are also a few exceptions. Such exceptions are frequently seen and can stem from inaccurately known Hansen Parameters. Reference to Table 1 reveals that solvents of polyaniline possess hydrogen bonding parameters, $\gamma_w$, in cases where they are known, that are greater than 68. The only non-solvents with $\gamma_2 > 68$ in Table 3 are methanol and water which both have $r >> R$ and are not expected to be solvents.

EXAMPLE 6

Doped polyaniline tosylate was prepared as in Example 1. Undoped polyaniline base was prepared as in Example 2. A few milligrams of these powered polyanilines were added to 2 ml of the prospective solvents and solvent mixtures listed below in Table 4.

TABLE 4

Solubility of Polyaniline Base (PAni Base) and Polyaniline Tosylate (PAni tosylate) in Selected Solvents

| Solvent | Solubility for PAni Base | Solubility for PAni Tosylate |
| --- | --- | --- |
| 1,3-Dioxane | i | i |
| 1,4-Dioxane | i | i |
| Tetrahydrofuran (THF) | i | i |
| 2-Ethylaminoethanol (EAE) | i | s |
| EAE/1,3-Dioxane | ss | — |
| EAE/1/4-Dioxane | ss | — |
| EAE/THF | s | s |

In the Table, "i" is insoluble; "s" is soluble; and "ss" is slightly soluble.

The results obtained with 2-ethylaminoethanol in combination with selected ethers demonstrated that polyaniline base can be soluble in mixtures of solvents even when it in insoluble in the neat constituents.

EXAMPLE 7

Undoped polyaniline in its base form was dissolved in dimethylformamide (DMF) and filtered to give a deep blue solution. Likewise polyaniline base was dissolved in pyrrolidine to give a deep blue solution. Phenyl hydrazine was added to each solution in an amount sufficient to render the solutions very light yellow and pale brown, respectively, indicating thereby that the polyaniline base had been reduced in each case to its leuco form (poly(phenylene amine), Formula IV). No clouding or precipitate was observed after 48 hours of standing which demonstrated that the leuco form is also at least equivalently soluble in these solvents.

EXAMPLE 8

Several pieces of polyethylene terephthalate film (5 inches × 4 inches) were coated with a 1.5 wt% solution of neutral polyaniline base in pyrrolidine by a transfer coating technique. In this technique, polyaniline solution was homogeneously laid down on the plastic films by a metal screen roller which contained hundreds of regularly engraved cells per square inch. The coated films were blue and nonconductive. After doping with an acid dopant solution, the films turned green and conductive.

When p-toluene sulfonic acid was used as the dopant, the surface resistances, measured by a disc probe (Keithley 6105), of these films ranged from $10^6$ to $10^7$ ohm/sq. When dodecylbenzenesulfonic acid was used, the surface resistance ranged from $10^7$ to $10^8$ ohm/sq.

What is claimed is:

1. A solution comprising:
   (a) a substituted or unsubstituted undoped non-electrically conductive polyaniline; and
   (b) a solvent or a mixture of solvents which have a net relative dielectric constant equal to or greater than 5, and a net dipole moment equal to or greater than about $3.5 \times 10^{-30}$ Cm, a net volatilization temperature equal to or less than about 250° C., a net hydrogen bonding capability ($\gamma_w$) of greater than about 50 and a Hildebrand Parameter ($\epsilon$) of from about 17 to about 29, said solvent other than dimethyl formamide, N-methylpyrrolidone, pyridine and dimethylsulfoxide, ethanol and chloroform, wherein the relative amounts of said polyaniline and said solvent or mixture are such that said solution has a viscosity of less than about 10,000 centiposie at a temperature less than said volatitization temperature.

2. A solution to claim 1 wherein said polyaniline is a homopolymer or copolymer comprising a substituted or unsubstituted polyaniline of the type derived from polymerizing an aniline of the formula:

wherein:
n is an integer from 0 to 5;
m is an integer from 0 to 5, with the proviso that the sum of n and m is 5; and
$R_1$ is phosphinic acid, phosphonic acid, sulfonic acid, boric acid, phosphoric acid, amino, sulfonate, borate, hydroxy, phosphonate, phosphinate, phosphate, sulfinic acid, nitro, sulfinate, carboxylic acid, halo, carboxylate, cyano, deuterium, or substituted or unsubstituted alkyl, alkenyl, alkoxy, cycloalkyl, cycloalkenyl, alkanoyl, alkylthio, alkynyl, dialkylamine, arylamino, diarylamino, alkylarylamino, aryloxy, hydroxy, alkylthioalkyl, alkylaryl, arylalkyl, aryloxy, amino, alkylthioalkyl, alkylaryl, arylalkyl, alkylsufinyl, alkoxyalkyl, alkylsulfonyl, aryl, arylthio, arylsulfinyl, alkoxycarbonyl, alkylsilane, or arylsulfonyl, wherein permissible substituents are one or more amino, alkylamino, dialkylamino, arylamino, diarylamino, alkylarylamino, phosphonic acid, sulfonic acid, boric acid, sulfinic acid, sulfinate, phosphoric acid, sulfonate, borate, carboxylate, phosphonate, phosphate, carboxylic acid, halo, nitro, hydroxy, cyano or epoxy moieties; or any two $R_1$ substituents or any one $R_1$ substituent and R2 substituent taken together may form substituted or unsubstitued alkylene, alkynylene or alkenylene chain completing a 3, 4, 5, 6, 7, 8, 9 or 10 membered aromatic, heteroalicyclic, heteroaromatic or alicyclic carbon ring, which ring may optionally include one or more divalent ester, carbonyl, nitrogen, sulfur, sulfinyl, sulfonyl or oxygen wherein permissible substituents are one or more amino, alkylamino, dialkylamino, arylamino, diarylamino, alkylarylamino, phosphonic acid, sulfonic acid, boric acid, sulfinic acid, sulfinate, phosphoric acid, sulfonate, borate, carboxylate, phosphonate, phosphate, carboxylic acid, halo, nitro, hydroxy, cyano or epoxy moieties, or $R_1$ or $R_2$ is an aliphatic moiety having repeat units of the formula:

wherein
q is a positive whole number; and
$R_2$ is the same or different at each occurrence and is $R_1$ substituents or hydrogen.

3. A solution according to claim 2 wherein said homopolymer or copolymer is of the formulas II to V:

II or

III or

IV or

V wherein:
x is an integer equal to or greater than 1;
y is equal to or greater than 1, with the proviso that the ratio of x to y is greater than about 0.5;
z is an integer equal to or greater than about 1;
n is an integer from 0 to 3;
m is an integer from 1 to 4, with the provisio that the sum of n and m is 4;
$R_1$ is the same or different at each occurrence and is alkyl, alkenyl, alkoxy, cycloalkyl, cycloalkenyl, alkanoyl, amino, alkylamino, dialkylamino, arylamino, diarylamino, alkylarylaminoalkylthio, aryloxy, alkylthioalkyl, alkylaryl, arylalkyl, alkylsulfinyl, alkoxyalkyl, alkylsulfonyl, aryl, arythio, arylsulfinyl, alkoxycarbonyl, phosphinic acid, phosphonic acid, alkylsilyl, boric acid, arylsulfonyl, carboxylic acid, halo, hydroxy, phosphate, sulfonate, phosphonate, borate, phosphinate, carboxylate, nitro, cyano, sulfonic acid, phosphoric acid or aryl, alkyl or alkoxy substituted with one or more sulfonic acid, carboxylic acid, sulfinate, phosphoric acid, boric acid, sulfinic acid, halogen, nitro, cyano, epoxy, hydroxy, sulfonate, phosphate, phosphonate, phosphinic acid, phosphinate, carboxylate, phosphonic acid or borate substituents; or any two $R_1$ groups or any one $R_1$ group and $R_2$ group together may form a substituted or unsubstituted alkylene or alkenylene chain completing a 3, 5, 5, 6, 7, 8, 9 or 10 membered heteroaromatic, heteroalicyclic, aromatic or alicyclic carbon ring, which chain may optionally include one or more divalent nitrogen, ester, carbonyl, sulfur, sulfinyl, sulfonyl or oxygen group wherein permissible substituents are one or more sulfonic acid, carboxylic acid, sulfinate, phosphoric acid, boric acid, sulfinic acid, halogen, nitro, cyano, epoxy, hydroxy, sulfonate, phosphate, phosphonate, phosphinic acid, phosphinate, carboxylate, phosphonic acid or borate substituents; and
$R_2$ is the same of different at each occurrence and is $R_1$ substituents or hydrogen.

4. A solution according to claim 3 wherein m is from about 2 to about 4.

5. A solution according to claim 4 wherein m is from about 3 to about 4.

6. A solution according to claim 4 wherein said polyaniline is derived from substituted anilines.

7. A solution according to claim 2 wherein said polyaniline is derived from unsubstituted aniline.

8. A solution according to claim 6 wherein $R_1$ is the same or different at each occurrence and is alkyl or alkoxy having from 1 to about 30 carbon atoms.

9. A solution according to claim 8 wherein $R_1$ is the same or different at each occurrence and is alkyl having from 1 to about 10 carbon atoms or alkoxy having from 1 to about 20 carbons.

10. A solution according to claim 3 wherein z is equal to or greater than about 5.

11. A solution according to claim 10 wherein z is equal to or greater than about 10.

12. A solution according to claim 9 wherein said polyaniline is of the Formulas III or V.

13. A solution according to claim 12 wherein x is equal to or greater than about 2, with the proviso that the ratio of x to y is at least about 2.

14. A solution according to claim 13 wherein x is from about 4 to about 8 and y is from about 0 to about 2, with the proviso that the ratio of x to y is at least about 2.

15. A solution according to claim 14 wherein x is 4 and y is 2.

16. A solution according to claim 13 wherein said volatilization temperature is equal to or less than about 200° C.

17. A solution according to claim 16 wherein said volatilization temperature is equal to or less than about 150° C.

18. A solution according to claim 17 wherein said volatilization temperature is equal to or less than about 100° C.

19. A solution according to claim 18 wherein said solvent is selected from the group consisting of primary, secondary, and tertiary aromatic and aliphatic amines and phosphines.

20. A solution according to claim 1, wherein said solvent has a hydrogen bonding capability of greater than about 60.

21. A solution according to claim 1 wherein said solvent is selected from the group of solvents or mixtures of solvents which have net Hansen parameters which satisfy the condition that the expression $[4(\delta_d-17.4)^2+(\delta_p-8.5)^2+(\delta_h-10.4)^2]^{\frac{1}{2}}$ is less than about 7 MPa$^{\frac{1}{2}}$.

22. A solution according to claim 21 wherein said expression is less than about 6 MPa$^{\frac{1}{2}}$.

23. A solution according to claim 22 wherein said expression is less than about 5 MPa$^{\frac{1}{2}}$.

24. A solution according to claim 21 wherein said solvent is selected from the group consisting of dimethylacetamide, dimethylpropionamide, 2-pyrrolidone, capryl lactams, caprolactam, piperidine, morpholine, ethylene diamine, N,N'-dimethylethylenediamine, N,N-dimethylethylenediamine, quinoline, 2-picoline, 4-picoline, butylamine, propylamine, aniline, 2,3-cyclohexenopyridine, 1-(3-aminopropyl)-2-picoline, tetrahydrofurfurylamine, 1,2,3,4-tetrahydroisoquinoline, dimethylhydrazine, hexamethylphosphoramide, 1,1,3,3-tetramethyl urea, m-cresol, benzylamine, benzyl alcohol, 2-methyoxy ethylamine, and 3-methoxy propylamine.

25. A solution according to claim 2 wherein $R_2$ is hydrogen.

26. A solution according to claim 2 wherein said polyaniline is polyaniline base.

27. A solution according to claim 10 wherein said polyaniline is unsubstituted and n is 0; and m is 4.

28. A solution according to claim 27 wherein said solvent is selected from the group os solvents or mixtrues of solvents which have net Hansen Parameters which satisfy the condition that the expression $[4(\delta_3 - 17.4^2 + (\delta_p - 8.5)^2 + (\delta_h - 10.4)^2]^{\frac{1}{2}}$.

29. A solution according to claim 28 wherein said expression is less than about 6 MPa$^{\frac{1}{2}}$.

30. A solution according to claim 29 wherein said expression is less than about 5 MPa$^{\frac{1}{2}}$.

31. A solution according to claim 29 wherein said volatilization temperature is equal to or less than about 150° C.

32. A solution according to claim 31 wherein said volatilization temperature is equal to or less than about 100° C.

33. A solution according to claim 31 wherein said solvent has a hydrogen bonding capability of greater than about 60.

34. A solution according to claim 33 wherein said solvent is selected from the group consisting of primary, secondary, and tertiary aromatic and aliphatic amines and phosphines.

35. A solution according to claim 33 wherein said solvent is selected from the group consisting of dimethylacetamide, dimethylpropionamide, 2-pyrrolidone, capryl lactams, caprolactam, piperidine, morpholine, ethylene diamine, N,N'-dimethylethylenediamine, N,N-dimethylethylenediamine, quinoline, 2-picoline, 4-picoline, butylamine, propylamine, aniline, 2,3-cyclohexenopyridine, 1-(3-aminopropyl)-2-picoline, tetrahydrofurfurylamine, 1,2,3,4-tetrahydroisoquinoline, dimethylhydrazine, hexamethylphosphoramide, 1,1,3,3-tetramethyl urea, m-cresol, benzylamine, benzyl alcohol, 2-methyoxy ethylamine, and 3-methoxy propylamine.

* * * * *